US010550235B2

(12) United States Patent
Abe

(10) Patent No.: US 10,550,235 B2
(45) Date of Patent: Feb. 4, 2020

(54) ACRYLIC RESIN COMPOSITION, METHOD FOR PRODUCING SAME, AND ACRYLIC RESIN FILM

(71) Applicant: Mitsubishi Rayon Co., Ltd., Tokyo (JP)

(72) Inventor: Junichi Abe, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/124,485

(22) PCT Filed: Mar. 10, 2015

(86) PCT No.: PCT/JP2015/056941
§ 371 (c)(1),
(2) Date: Sep. 8, 2016

(87) PCT Pub. No.: WO2015/137309
PCT Pub. Date: Sep. 17, 2015

(65) Prior Publication Data
US 2017/0022334 A1    Jan. 26, 2017

(30) Foreign Application Priority Data
Mar. 13, 2014 (JP) ................................ 2014-049823

(51) Int. Cl.
C08J 5/18 (2006.01)
C08L 33/08 (2006.01)

(52) U.S. Cl.
CPC ................ *C08J 5/18* (2013.01); *C08L 33/08* (2013.01); *C08J 2333/08* (2013.01); *C08J 2433/12* (2013.01); *C08L 2201/10* (2013.01); *C08L 2203/16* (2013.01); *C08L 2205/02* (2013.01); *C08L 2205/025* (2013.01); *C08L 2205/03* (2013.01)

(58) Field of Classification Search
CPC .................................. C08J 5/18; C08L 33/08
USPC ....................................................... 428/220
See application file for complete search history.

(56) References Cited

U.S. PATENT DOCUMENTS 5,543,463 A * 8/1996 Kitaike ................. B32B 27/30
525/223
5,563,227 A * 10/1996 Kitaike ................. B32B 27/30
428/402
6,309,739 B1 10/2001 Koizumi et al.
6,476,148 B1 * 11/2002 Gross ......................... C08J 5/18
428/337
2005/0192393 A1 * 9/2005 Kimura .................. C08K 5/527
524/451
2013/0186467 A1 * 7/2013 Saeki .................... B29C 33/424
136/259
2014/0117397 A1 * 5/2014 Saeki ................. B29D 11/0048
257/98

FOREIGN PATENT DOCUMENTS

| EP | 0964025 A1 | 12/1999 | |
| EP | 2518093 A1 * | 10/2012 | ............ C08F 265/06 |
| EP | 2716707 A1 * | 4/2014 | ............ C08F 265/06 |
| JP | S57-195153 A | 11/1982 | |
| JP | 05093122 A * | 4/1993 | |
| JP | H09-263614 A | 10/1997 | |
| JP | 2002-020571 A | 1/2002 | |
| JP | 2002-309059 A | 10/2002 | |
| JP | 2006-143785 A | 6/2006 | |
| JP | 2006-299038 A | 11/2006 | |
| JP | 2009-120817 A | 6/2009 | |
| JP | 2010-275434 A | 12/2010 | |
| JP | 2012-030506 A | 2/2012 | |
| JP | 2013010323 A * | 1/2013 | |
| WO | 2012/035939 A1 | 3/2012 | |
| WO | WO-2012165526 A1 * | 12/2012 | ............ C08F 265/06 |
| WO | WO-2012173258 A1 * | 12/2012 | ......... B29D 11/0048 |

OTHER PUBLICATIONS

Machine_English_translation_JP_05093122_A; Acrylic Resin Composition; Apr. 16, 1993; JPO; whole document.*
Machine_English_translation_JP_2013010323_A; Hard Coat Film; Jan. 7, 2013; JPO; whole document.*
Extended European Search Report issued in counterpart European Patent Application No. 15761765.5 dated Jan. 16, 2017.
International Search Report issued in corresponding International Patent Application No. PCT/JP2015/056941 dated May 26, 2015.

* cited by examiner

Primary Examiner — Tahseen Khan
(74) Attorney, Agent, or Firm — Morgan, Lewis & Bockius LLP

(57) ABSTRACT

The purpose of the present invention is to provide an acrylic resin composition that is a raw material for an acrylic resin film which has an excellent appearance and in which occurrence of blocking is suppressed. The present invention is an acrylic resin composition that comprising an acrylic polymer (A), an anti-blocking agent (B), and a non-crosslinked acrylic polymer (C). The non-crosslinked acrylic polymer (C) is a polymer of a monomer component including 50% to 100% by mass of methyl methacrylate (c1), the polymer having a reduced viscosity of 0.2 to 2 L/g.

19 Claims, No Drawings

ACRYLIC RESIN COMPOSITION, METHOD FOR PRODUCING SAME, AND ACRYLIC RESIN FILM

TECHNICAL FIELD

The present invention relates to an acrylic resin composition, a method for producing the same, and an acrylic resin film.

BACKGROUND ART

Molded products formed from acrylic resins have excellent transparency, and have beautiful external appearance and weather resistance, and therefore, these molded products are widely used for applications such as electronic components, automotive parts, optical components, decorations, and sign boards. Particularly, acrylic resin molded products formed from acrylic resin compositions containing rubber-containing polymers are widely utilized.

Such rubber-containing polymers are produced by, for example, an emulsion polymerization method. Specifically, a polybutadiene latex, a styrene-butadiene copolymer latex, a styrene-butadiene-acrylonitrile copolymer latex, and an acryl rubber latex are produced by emulsion polymerization methods. Then, each of these latexes is subjected to a treatment of salting out, acid solidification, spray drying, or freeze-drying, and thereby a polymer in a powder form is separated and collected. To this polymer in a powder form, usually, compounding agents are appropriately added. The polymer having compounding agents added thereto is melt-kneaded with a single-screw extruder, a twin-screw extruder or the like, and is extruded as strands, which are then cut by a cold cutting method or a hot cutting method and pelletized. Subsequently, these pellets are supplied to a molding machine and processed into acrylic resin molded products.

Film-like acrylic resin molded products (hereinafter, also referred to as "acrylic resin films") have a feature of having excellent transparency, weather resistance, flexibility and processability. In the light of utilizing this feature, acrylic resin films are laminated on the surfaces of various resin molded articles, wood products, and metal molded articles.

Patent Document 1 proposes, in relation to the production of an optical film by stretching between rolls, a method for producing a smooth film that has no rupture of the film caused by fusion to heated rolls, no terraced planar defects (level unevenness), or no stretch unevenness.

Patent Document 2 proposes a film having improved blocking properties and slip properties with deteriorating transparency, which is obtainable by adding, to a transparent synthetic resin as a base, finely powdered glass having a refractive index that has been adjusted to match the refractive index of the base synthetic resin.

Patent Document 3 proposes an acrylic resin film having excellent external appearance, in which the density of foreign materials is 1 piece/m$^2$ or less.

CITATION LIST

Patent Document

Patent Document 1: JP 2010-275434 A
Patent Document 2: JP 57-195153 A
Patent Document 3: JP 09-263614 A

DISCLOSURE OF THE INVENTION

Problem to be Solved by the Invention

However, in the films obtainable by the production methods that have been proposed in Patent Document 1 and Patent Document 2 mentioned above, only anti-blocking agents can be added thereto, and the effect in view of prevention of blocking may be insufficient. Furthermore, when such a film is made into a thin film, since the particle sizes of anti-blocking agents are large, the surface unevenness becomes larger, and a film having impaired transparency may be obtained.

Furthermore, in Patent Document 3, since only a thermoplastic polymer having a high molecular weight is added, the effect in view of preventing blocking may be insufficient, similarly to the cases of Patent Document 1 and Patent Document 2.

Thus, an object of the present invention is to provide an acrylic resin composition that may be used as a raw material of an acrylic resin film having suppressed occurrence of blocking and having excellent external appearance.

Means for Solving Problem

The present invention provides the following means.

[1] An acrylic resin composition comprising an acrylic polymer (A), an anti-blocking agent (B), and a non-crosslinked acrylic polymer (C) such as described below:

non-crosslinked acrylic polymer (C): a polymer of a monomer component including 50% to 100% by mass of methyl methacrylate (c1), the polymer having a reduced viscosity of 0.2 to 2 L/g.

[2] The acrylic resin composition according to [1], wherein the content of the anti-blocking agent (B) is 0.01 parts to 0.5 parts by mass, and the content of the non-crosslinked acrylic polymer (C) is 0.1 parts to 5 parts by mass, relative to 100 parts by mass of the acrylic polymer (A).

[3] The acrylic resin composition according to [1] or [2], in which the average primary particle size of the anti-blocking agent (B) is 5 nm to 10 μm.

[4] The acrylic resin composition according to any one of [1] to [3], in which the anti-blocking agent (B) is in the form of inorganic particles.

[5] The acrylic resin composition according to any one of [1] to [4], in which the anti-blocking agent (B) is silicon dioxide.

[6] The acrylic resin composition according to any one of [1] to [5], in which the acrylic polymer (A) includes at least one of a rubber-containing polymer (A1) and a non-rubber-containing polymer (A2).

[7] The acrylic resin composition according to [6], in which the percentage content of the rubber-containing polymer (A1) in the acrylic polymer (A) is 10% to 100% by mass, and the percentage content of the non-rubber-containing polymer (A2) is 90% to 0% by mass.

[8] The acrylic resin composition according to [6] or [7], in which the reduced viscosity of the non-rubber-containing polymer (A2) is 0.03 to 0.1 L/g.

[9] An acrylic resin film obtainable by molding the acrylic resin composition according to any one of [1] to [8].

[10] The acrylic resin film according to [9], in which the tensile modulus is 800 to 1500 MPa, and the film thickness is 20 to 150 μm.

[11] An acrylic resin film having an arithmetic mean roughness Ra on at least one surface of 9 to 16 nm, and having a maximum height roughness Rz on at least one surface of 300 to 1550 nm.

[12] The acrylic resin film according to [9] or [10], in which the arithmetic mean roughness Ra on at least one surface is 9 to 16 nm, and the maximum height roughness Rz on at least one surface is 300 to 1550 nm.

[13] The acrylic resin film according to any one of [9] to [12], in which the value of haze measured according to JIS K7105 is 2% or less, and the value of glossiness measured according to JIS K7105 is 135% or more.

[14] A method for producing an acrylic resin composition, the method comprising blending an acrylic polymer (A), an anti-blocking agent (B), and a non-crosslinked acrylic polymer (C) such as described below:

non-crosslinked acrylic polymer (C): a polymer of a monomer component including 50% to 100% by mass of methyl methacrylate (c1), the polymer having a reduced viscosity of 0.2 to 2 L/g.

Effect of the Invention

According to the present invention, an acrylic resin composition which may be used as a raw material of an acrylic resin film having suppressed occurrence of blocking and having excellent external appearance, can be provided.

Mode(s) for Carrying out the Invention

Hereinafter, the acrylic resin composition and the acrylic resin film of the present invention will be described. Furthermore, in the following description, "alkyl acrylate" and "alkyl methacrylate" mean an alkyl ester of acrylic acid and an alkyl ester of methacrylic acid, respectively. Also, "alkyl (meth)acrylate" means an alkyl acrylate and/or an alkyl methacrylate.

<Acrylic Polymer (A)>

Regarding the acrylic polymer (A) according to the present invention, for example, at least one selected from a rubber-containing polymer (A1) and a non-rubber-containing polymer (A2) such as described below can be used. The acrylic polymer (A) may be composed of a rubber-containing polymer (A1) and a non-rubber-containing polymer (A2).

The rubber-containing polymer (A1) is preferably a rubber-containing polymer obtainable by polymerizing a monomer component (b) including 51% by mass or more of an alkyl methacrylate, in the presence of a rubber polymer obtainable by polymerizing a monomer component (a) including 30% by mass or more of an alkyl acrylate.

The rubber-containing polymer (A1) is preferably a polymer produced through a step of producing a rubber polymer by polymerizing a monomer component (a) including 30% by mass or more of an alkyl acrylate; and a step of polymerizing a monomer component (b) including 51% by mass or more of an alkyl methacrylate in the presence of the rubber polymer.

The monomer component (a) is preferably a component which, when polymerized alone, gives a polymer having a glass transition temperature (Tg) of −50° C. to 25° C. Furthermore, the monomer component (b) is preferably a component which, when polymerized alone, gives a polymer having a glass transition temperature (Tg) of 70° C. to 120° C.

Before the step of polymerizing the monomer component (a) described above, a step of emulsion polymerizing a monomer component (s) which, when polymerized alone, gives a polymer having a Tg of 70° C. to 120° C., may be included. Furthermore, between the step of emulsion polymerizing the monomer component (a) and the step of emulsion polymerizing the monomer component (b), a step of emulsion polymerizing a monomer component (c) may be included as necessary.

The acrylic polymer (A) may also include a non-rubber-containing polymer (A2). Furthermore, the acrylic polymer (A) may also include a rubber-containing polymer (A1) and a non-rubber-containing polymer (A2).

The non-rubber-containing polymer (A2) is preferably a polymer of a monomer component composed of 50% to 100% by mass of an alkyl methacrylate having an alkyl group having 1 to 4 carbon atoms and 0% to 50% by mass of another vinyl monomer that can be copolymerized with this alkyl methacrylate, the polymer being a thermoplastic polymer having a reduced viscosity of 0.03 to 0.1 L/g. This reduced viscosity is more preferably 0.03 to 0.08 L/g.

Furthermore, this reduced viscosity is determined by dissolving 0.1 g of a polymer in 100 ml of chloroform, and determining and calculating the relative viscosity with respect to chloroform at 25° C. using an Ostwald type fine viscometer tube.

In order to adjust the reduced viscosity to this range, it is preferable to control the amount of use of a chain transfer agent or a polymerization initiator used. For example, it is preferable to adjust the content of a chain transfer agent to 0.005 parts to 0.05 parts by mass relative to 100 parts by mass of the monomer that is used as a raw material of the non-rubber-containing polymer (A2).

With respect to the non-rubber-containing polymer (A2), the percentage content of the alkyl methacrylate in the monomer component is 50% to 100% by mass, and preferably 70% to 100% by mass. The percentage content of the other vinyl monomer that can be copolymerized with the alkyl methacrylate in the monomer component is 0% to 50% by mass, and preferably 0% to 30% by mass. Regarding the alkyl methacrylate, one kind may be used singly, or two or more kinds may be used in combination. In regard to the alkyl methacrylate, the alkyl group may be straight-chained, or may be branched. Examples of the alkyl methacrylate include methyl methacrylate, ethyl methacrylate, n- or i-propyl methacrylate, and n-, i- or t-butyl methacrylate.

Examples of the other vinyl monomer that can be copolymerized with an alkyl methacrylate include an alkyl acrylate, an aromatic vinyl monomer, and a vinyl cyanide monomer. The other vinyl monomer that can be copolymerized may be used singly, or two or more kinds thereof may be used in combination. In regard to the alkyl acrylate, the alkyl group may be straight-chained, or may be branched. Examples of the alkyl acrylate include methyl acrylate, ethyl acrylate, n- or i-propyl acrylate, n-, i- or t-butyl acrylate, 2-ethylhexyl acrylate, and n-octyl acrylate. Examples of the aromatic vinyl monomer include styrene, α-methylstyrene, chlorostyrene, and vinyltoluene. Furthermore, examples of the vinyl cyanide monomer include acrylonitrile and methacrylonitrile.

Furthermore, the glass transition temperature of the non-rubber-containing polymer (A2) is preferably 80° C. to 110° C.

Specific examples of such a non-rubber-containing polymer (A2) include "ACRYPET VH", "ACRYPET MD", and "ACRYPET MF" (all trade names) manufactured by Mitsubishi Rayon Co., Ltd.

The percentage content of the rubber-containing polymer (A1) in the acrylic polymer (A) is preferably 10% to 100% by mass, and more preferably 20% to 100% by mass. The percentage content of the non-rubber-containing polymer (A2) in the acrylic polymer (A) is preferably 90% to 0% by mass, and more preferably 80% to 0% by mass.

[Method for Producing Rubber-containing Polymer (A1)]

Regarding the method for producing a rubber-containing polymer (A1), first, the monomer component will be described, and then the polymerization method will be described.

[Monomer Component (a)]

The monomer component (a) is a monomer mixture including 30% by mass or more of an alkyl acrylate based on 100% by mass of the total amount of monomers. It is preferable that the monomer component (a) be used as a raw material for the polymerization of a first stage. When polymerization is performed using the component (a) as a raw material, a rubber polymer is produced.

In regard to the alkyl acrylate (hereinafter, may be referred to as "monomer (a1)") in the monomer component (a), the alkyl group may be either straight-chained or branched. Examples of the alkyl acrylate include methyl acrylate, ethyl acrylate, n- or i-propyl acrylate, n-, i- or t-butyl acrylate, 2-ethylhexyl acrylate, and n-octyl acrylate. Among these, n-butyl acrylate is preferred. These may be used singly, or two or more kinds thereof may be used in combination.

Examples of a monomer other than an alkyl acrylate in the monomer component (a) include an alkyl methacrylate (hereinafter, may be referred to as "monomer (a2)"), another monomer having one double bond, which can be copolymerized with these (alkyl acrylate or alkyl methacrylate) (hereinafter, may be referred to as "monofunctional monomer (a3)"), and a polyfunctional monomer (hereinafter, may be referred to as "polyfunctional monomer (a4)").

In regard to the alkyl methacrylate in the monomer component (a), the alkyl group may be straight-chained, or may be branched. Examples of the alkyl methacrylate include methyl methacrylate, ethyl methacrylate, n- or i-propyl methacrylate, and n-, i- or t-butyl methacrylate. These may be used singly, or two or more kinds thereof may be used in combination.

Examples of the monofunctional monomer (a3) include acrylic monomers such as an alkoxy acrylate, cyanoethyl acrylate, acrylamide, and (meth)acrylic acid; aromatic vinyl monomers such as styrene and an alkyl-substituted styrene; and vinyl cyanide monomers such as acrylonitrile and methacrylonitrile. These may be used singly, or two or more kinds thereof may be used in combination.

The polyfunctional monomer (a4) may be a crosslinkable monomer having two or more copolymerizable double bonds in one molecule, and specific examples thereof include the following compounds: alkylene glycol di(meth)acrylates such as ethylene glycol di(meth)acrylate, 1,3-butylene glycol di(meth)acrylate, 1,4-butylene glycol di(meth)acrylate, and propylene glycol di(meth)acrylate; polyvinylbenzenes such as divinylbenzene and trivinylbenzene; cyanurate-based monomers such as triallyl cyanurate and triallyl isocyanurate; and allyl, methallyl or crotyl esters of $\alpha,\beta$-unsaturated carboxylic acids or dicarboxylic acids, such as allyl methacrylate. These may be used singly, or two or more kinds thereof may be used in combination.

The percentage content of the alkyl acrylate in the monomer component (a) is preferably 30% to 99.9% by mass, and more preferably 35% by mass or more. The percentage content of the alkyl methacrylate in the monomer component (a) is preferably 0% to 69.9% by mass, more preferably 65% by mass or less, and even more preferably 60% by mass or less. The percentage content of the monofunctional monomer (a3) in the monomer component (a) is preferably 0% to 20% by mass, and more preferably 10% by mass or less. The percentage content of the polyfunctional monomer (a4) in the monomer component (a) is preferably 0.1% to 10% by mass.

The glass transition temperature (hereinafter, referred to as "Tg") of the rubber polymer is preferably from −50° C. to 25° C., for example, from the viewpoints of flexibility in film applications, and impact resistance in the applications of impact strength improving agents. Furthermore, according to the present invention, Tg refers to the value calculated by Fox's equation using the values described in Polymer Handbook (J. Brandrup, Interscience, 1989).

Furthermore, the percentage content of the rubber polymer in the rubber-containing polymer (A1) is preferably 5% to 70% by mass, for example, from the viewpoints of the film-forming properties of the rubber-containing polymer (A1) in film applications, and the impact resistance of a resin molded product to which the rubber-containing polymer (A1) has been added, in the applications of impact strength improving agents.

The monomer component (a) in the rubber-containing polymer (A1) may be polymerized in one stage, or may be polymerized dividedly in two or more stages. In other words, the rubber polymer may be constructed in one stage, or may be constructed in two or more stages. In a case in which the rubber polymer is polymerized in two or more stages, the compositions of the monomer component (a) used in the respective polymerization stages may be identical or may be different.

[Monomer Component (b)]

The monomer component (b) is a monomer mixture used as a raw material for the polymerization of the final stage, and is a component related to the moldability and mechanical properties of the rubber-containing polymer (A1). The Tg obtainable when the monomer component (b) is polymerized alone is preferably from 70° C. to 120° C. from the viewpoints of heat resistance, moldability and the like. When polymerization is performed using the monomer component (b) as a raw material, a hard polymer is produced.

The description for the alkyl methacrylate in the monomer component (b) can be considered to be the same as the description for the alkyl methacrylate in the monomer component (a), and regarding the alkyl methacrylate, for example, one kind or two or more kinds of monomers listed as examples of the "monomer (a2)" can be used.

Examples of another monomer in addition to the alkyl methacrylate in the monomer component (b) include an alkyl acrylate, and another monomer having one double bond, which can be copolymerized with these (alkyl methacrylate and alkyl acrylate) (hereinafter, may be referred to as "monofunctional monomer (b3)").

The description for the alkyl acrylate can be considered to be the same as the description for the "monomer (a1)", and for example, one kind or two or more kinds of monomers listed as examples of the "monomer (a1)" can be used.

The description for the monofunctional monomer (b3) can be considered to be the same as the description for the "monofunctional monomer (a3)", and for example, one or more kinds of monomers listed as examples of the "monofunctional monomer (a3)" can be used.

The monomer component (b) may be polymerized in one stage, or may be polymerized dividedly in two or more stages. In other words, the hard polymer may be constructed in one stage, or may be constructed in two or more stages. In a case in which polymerization is performed in two or more stages, the compositions of the monomer component (b) used in the respective polymerization stages may be identical or may be different. The percentage content of the alkyl methacrylate in the monomer component (b) is preferably 51% to 100% by mass, more preferably 60% by mass or more, and even more preferably 70% by mass or more. The percentage content of the alkyl acrylate in the monomer component (b) is preferably 0% to 20% by mass, and more preferably 10% by mass or less. The percentage content of the monomer (b3) in the monomer component (b) is preferably 0% to 49% by mass, more preferably 40% by mass or less, even more preferably 30% by mass or less, and particularly preferably 20% by mass or less.

The amount of use of the monomer component (b) based on 100% by mass of the total amount of the monomer components used in the entire process of the method for polymerizing the rubber-containing polymer (A1) is preferably 30% to 95% by mass, for example, from the viewpoints of the film-forming properties of the rubber-containing polymer (A1) in film applications, and the impact resistance of a resin molded product to which the rubber-containing polymer (A1) has been added, in the applications of impact strength improving agents.

[Monomer Component (s)]

As described above, before the step of producing a rubber polymer by polymerizing the monomer component (a), a step of emulsion polymerizing the monomer component (s) can be included. The Tg of a polymer obtainable by polymerizing the monomer component (s) alone is 70° C. to 120° C. Regarding the monomer component (s), the same compounds as the monomer component (b) may be employed.

[Monomer Component (c)]

As described above, between the step of producing a rubber polymer by polymerizing the monomer component (a) and the step of polymerizing the monomer component (b) in the presence of the rubber polymer, a step of emulsion polymerizing the monomer component (c) in the presence of the rubber polymer can be included.

Regarding the monomer component (c), a mixture including 9.9% to 90% by mass of an alkyl acrylate, 0% to 90% by mass of an alkyl methacrylate, 0% to 20% by mass of another monomer having one double bond, which can be copolymerized with these (alkyl acrylate and alkyl methacrylate), and 0.1% to 10% by mass of a polyfunctional monomer, may be used. Examples of the other monomer and the polyfunctional monomer used herein include the monofunctional monomer (a3) and the polyfunctional monomer (a4) mentioned above. These may be used singly, or two or more kinds thereof may be used in combination.

In the step of emulsion polymerizing the monomer component (c), polymerization may be performed in one stage, or polymerization may be performed dividedly in two or more stages; however, it is preferable that polymerization be performed dividedly in two or more stages. In a case in which polymerization is performed in two or more stages, the compositions of the monomer components (c) used in the respective polymerization stages may be identical or may be different.

Furthermore, a surfactant may also be added to the monomer component (c), and the monomer component (c) may be mixed and stirred with water and supplied as an emulsion liquid into the polymerization vessel.

[Polymerization Method]

Regarding the method for producing the rubber-containing polymer (A1), for example, a sequential multistage emulsion polymerization method may be used. For example, as a method of performing polymerization in three stages, the following steps may be employed. Step 1: a monomer component (a) for obtaining a rubber polymer, water and a surfactant are mixed and produced into an emulsion liquid, and the emulsion liquid is supplied in that state into a polymerization vessel. Step 2: a monomer component (c) is supplied into the polymerization vessel and polymerized. Step 3: furthermore, a monomer component (b), water and a surfactant are mixed and produced into an emulsion liquid, and the emulsion liquid is supplied in that state into the polymerization vessel to be polymerized therein. Meanwhile, the step of supplying the monomer component (c) into the polymerization vessel and performing polymerization is a step that is carried out as necessary.

A manufactured product obtainable using the rubber-containing polymer (A1) described above has an advantage that the proportion of coarse particles is small. Particularly, in a case in which the manufactured product is a film, the product has an advantage that the product has fewer fisheyes.

Examples of the surfactant used when the polymer is produced by a sequential multistage emulsion polymerization method, include anionic, cationic, and nonionic surfactants. These may be used singly, or two or more kinds thereof may be used in combination.

Examples of anionic surfactants include the following compounds: carboxylic acid salts such as rosin soap, potassium oleate, sodium stearate, sodium myristate, sodium N-lauroyl sarcosinate, and dipotassium alkenyl succinate; sulfuric acid ester salts such as sodium lauryl sulfate; sulfonic acid salts such as sodium dioctyl sulfosuccinate, sodium dodecyl benzenesulfonate, and sodium alkyl diphenyl ether disulfonate; and phosphoric acid ester salts such as sodium polyoxyethylene alkylphenyl ether phosphate and sodium polyoxyethylene alkyl ether phosphate. Specific examples of commercially available products of anionic surfactants include products under the following trade names: ELEMINOL NC-718 manufactured by Sanyo Chemical Industries, Ltd.; PHOSPHANOL LO-529, PHOSPHANOL RS-610NA, PHOSPHANOL RS-620NA, PHOSPHANOL RS-630NA, PHOSPHANOL RS-640NA, PHOSPHANOL RS-650NA, and PHOSPHANOL RS-660NA manufactured by Toho Chemical Industry Co., Ltd.; and LATEMUL P-0404, LATEMUL P-0405, LATEMUL P-0406, and LATEMUL P-0407 manufactured by Kao Corp.

Regarding the method for preparing an emulsion liquid by mixing a monomer component, water and a surfactant, for example, the following methods (1) to (3) may be employed. (1) A method of introducing a monomer component into water, and then introducing a surfactant thereinto; (2) a method of introducing a surfactant into water, and then introducing a monomer component thereinto; and (3) a method of introducing a surfactant into a monomer component, and then introducing water thereinto.

Regarding a mixing apparatus for preparing an emulsion liquid by mixing a monomer component, water and a surfactant, for example, a stirrer equipped with a stirring blade; a forced emulsifying apparatus such as a homogenizer or a homomixer; and a film emulsifying apparatus.

Regarding the emulsion liquid, any of a W/O type dispersion in which water droplets are dispersed in an oil of a monomer component, or an O/W type dispersion in which oil droplets of a monomer component are dispersed in water, can be used. An O/W type dispersion is preferred, and the diameter of the oil droplets in the dispersed phase is preferably 100 μm or less, more preferably 50 μm or less, and even more preferably 15 μm or less.

It is desired that the amount of the surfactant used for the preparation of an emulsion liquid is adjusted to be from 0.5 parts by mass to 1.6 parts by mass, when the total amount of the monomer components used in all of the stages (steps) of polymerization is designated as 100 parts by mass. In regard to the adjustment of the particle size of a sequential multi-stage polymer, usually, the particle size is regulated by the amount of use of the surfactant in the first stage. However, apart from the surfactant that is added to the monomer component, when a surfactant is added to water (aqueous medium) that is introduced in advance into the polymerization vessel, the particle size of the rubber-containing polymer can be made small with a smaller amount of surfactant.

Regarding the polymerization initiator and the chain transfer agent used when the monomer component (a) and the monomer component (b) are polymerized, or when the monomer component (C) is polymerized, any known polymerization initiator and chain transfer agent can be used. Regarding the method for adding a polymerization initiator and a chain transfer agent, for example, a method of adding the agents to any one of the aqueous phase and the monomer phase, or a method of adding the agents to both of the phases may be employed.

Examples of the polymerization initiator include peroxides, azo-based initiators, and redox-based initiators. Redox-based initiators include an initiator combining a peroxide with an oxidizing agent or a reducing agent, and an initiator combining an azo-based initiator with an oxidizing agent or a reducing agent. Specific examples of the redox-based initiators include ferrous sulfate, disodium ethylenediamine tetraacetate, and a sulfoxylate-based initiator combining sodium formaldehyde sulfoxylate with a hydroperoxide. These may be used singly, or two or more kinds thereof may be used in combination.

Examples of the chain transfer agent include an alkyl mercaptan having 2 to 20 carbon atoms, a mercapto acid, thiophenol, and tetrachlorocarbon. These may be used singly, or two or more kinds thereof may be used in combination. Examples of the alkyl mercaptan include n-octyl mercaptan.

Regarding the method for producing a latex of the rubber-containing polymer (A1), as described above, a method for producing the latex by a method of mixing the monomer component (a), water and a surfactant into an emulsion liquid, supplying the emulsion liquid in that state into a reactor, polymerizing the emulsion liquid, subsequently supplying the monomer component (c) into the reactor, polymerizing the mixture, mixing the monomer component (b), water and a surfactant into an emulsion liquid, supplying the emulsion liquid in that state into the reactor, and performing polymerization, may be employed. In this case, preferred is a method of heating an aqueous solution in a reactor, which includes ferrous sulfate, disodium ethylenediamine tetraacetate, and sodium formaldehyde sulfoxylate dihydrate, to the polymerization temperature, subsequently supplying an emulsion liquid obtained by mixing the monomer component (a), water and a surfactant into the reactor, performing polymerization, subsequently supplying the monomer component (c) into the reactor, performing polymerization, further supplying an emulsion liquid obtained by mixing the monomer component (b), water and a surfactant into the reactor, and performing polymerization.

The polymerization temperature for obtaining a latex of the rubber-containing polymer (A1) may vary depending on the kind or amount of the polymerization initiator used or the like; however, the polymerization temperature is, for example, about 40° C. to 120° C.

A latex of the rubber-containing polymer (A1) obtained by the method described above can be treated using a filtering apparatus having a filter material disposed therein, if necessary.

A latex of the rubber-containing polymer (A1) obtained as such can be used for various applications, while being in the form of latex. Furthermore, the rubber-containing polymer (A1) can be obtained by collecting the rubber-containing polymer (A1) from the latex by a known method such as a salting-out solidification method, an acid solidification method, a freeze solidification method, or a spray drying method, and drying the rubber-containing polymer (A1). The rubber-containing polymer (A1) can be used in a powder form. Furthermore, this powder can be pelletized by melt extruding the powder.

In a case in which the rubber-containing polymer (A1) is collected by a solidification method through a salting out treatment using a metal salt, it is preferable that the percentage content of residual metal in the rubber-containing polymer (A1) that is finally obtained be adjusted to 800 ppm or less. It is more preferable if the percentage content of residual metal is a trace amount.

<Anti-blocking Agent (B)>

The acrylic resin composition of the present invention includes an anti-blocking agent (B). The anti-blocking agent (B) exists as particles in the acrylic resin composition, and has a function of forming surface unevenness on the surface when the acrylic resin composition is produced into a film.

Examples of the anti-blocking agent (B) include inorganic particles of silicon dioxide, talc, and diatomaceous earth; and crosslinked particle of polymethyl methacrylate. The anti-blocking agent (B) is preferably silicon dioxide.

The size of the anti-blocking agent (B) is preferably such that the average primary particle size is 5 nm to 10 µm. In a case in which the average primary particle size of the anti-blocking agent (B) is 5 nm or more, the blocking preventing effect can be enhanced. Furthermore, in a case in which the average primary particle size of the anti-blocking agent (B) is 10 µm or less, generation of fisheyes or a decrease in transparency can be suppressed. The average primary particle size of the anti-blocking agent (B) is more preferably 5 to 50 nm.

The average primary particle size of the anti-blocking agent (B) can be calculated from the specific surface area according to the BET method. Furthermore, the average primary particle size can also be measured using a laser method.

The content of the anti-blocking agent (B) is preferably 0.01 to 0.5 parts by mass, and more preferably 0.02 to 0.4 parts by mass, relative to 100 parts by mass of the acrylic polymer (A). In a case in which the content of the anti-blocking agent (B) is 0.01 parts by mass or more, a sufficient blocking preventing effect can be provided. In a case in which the content of the anti-blocking agent (B) is 0.5 parts by mass or less, deterioration of the transparency of the acrylic resin molded product (for example, a film) thus obtainable can be effectively suppressed, or the generation of fisheyes can be effectively reduced.

<Non-crosslinked Acrylic Polymer (C)>

The acrylic resin composition of the present invention includes a non-crosslinked acrylic polymer (C) such as described below.

The non-crosslinked acrylic polymer (C) is a polymer of a monomer component including 50% to 100% by mass of methyl methacrylate (c1), and having a reduced viscosity (0.1 g of a polymer is dissolved in 100 ml of chloroform, and the relative viscosity with respect to chloroform at 25° C. is determined and calculated using an Ostwald type fine viscometer tube) of 0.2 to 2 L/g. The monomer component may also include 50% to 0% by mass of another vinyl-based monomer (c2) that can be copolymerized with the methyl methacrylate (c1). Polymerization is carried out by emulsion polymerization, and the product is subjected to a solidification process or a drying process and is collected (solid-liquid separation) as a powder.

It is preferable that the non-crosslinked acrylic polymer (C) be obtained by polymerizing 50% to 100% by mass of methyl methacrylate (c1), and 50% to 0% by mass of another vinyl-based monomer (c2) that can be copolymerized with this methyl methacrylate. Furthermore, the non-crosslinked acrylic polymer (C) is more preferably a polymer of 50% to 90% by mass of methyl methacrylate (c1) and 50% to 10% by mass of another vinyl-based monomer (c2) having a double bond, which can be copolymerized with the methyl methacrylate. The other vinyl-based monomer that can be copolymerized with this (methyl methacrylate) may be used singly, or two or more kinds thereof may be used in combination. Examples of the other vinyl-based monomer that can be copolymerized with methyl methacrylate include an alkyl acrylate having an alkyl group having 1 to 8 carbon atoms, an alkyl methacrylate having an alkyl group having 2 to 4 carbon atoms, an aromatic vinyl monomer, and a vinyl cyanide monomer. The alkyl acrylate having an alkyl group having 1 to 8 carbon atoms may be any of a straight-chained group or a branched group, and specific examples thereof include methyl acrylate, ethyl acrylate, propyl acrylate, butyl acrylate, 2-ethylhexyl acrylate, and n-octyl acrylate. Furthermore, the alkyl methacrylate having an alkyl group having 2 to 4 carbon atoms may be any of a straight-chained group or a branched group, and specific examples thereof include ethyl methacrylate, propyl methacrylate, and butyl methacrylate. Examples of the aromatic vinyl monomer include styrene, t-methylstyrene, chlorostyrene, and vinyltoluene. Furthermore, examples of the vinyl cyanide monomer include acrylonitrile and methacrylonitrile. The other vinyl monomer (c2) is preferably methyl acrylate, ethyl acrylate, propyl acrylate, butyl acrylate, or 2-ethylhexyl acrylate.

The non-crosslinked acrylic polymer (C) is a polymer polymerized so as to obtain a reduced viscosity (0.1 g of a polymer is dissolved in 100 ml of chloroform, and the relative viscosity with respect to chloroform at 25° C. is determined and calculated using an Ostwald fine viscometer tube) of 0.2 to 2 L/g. By using the non-crosslinked acrylic polymer (C), the processability needed when the acrylic resin composition is molded into a film, or the blocking preventive performance can be enhanced. The reduced viscosity can be adjusted to this range by regulating the amount of use of the chain transfer agent or the polymerization initiator at the time of producing the acrylic resin composition. For example, it is preferable to use 0 parts to 0.02 parts by mass of a chain transfer agent relative to 100 parts by mass of the total amount of the monomer component used as a raw material of the non-crosslinked acrylic polymer (C).

The content of the non-crosslinked acrylic polymer (C) is preferably 0.1 parts to 5 parts by mass, and more preferably 0.5 parts to 4 parts by mass, relative to 100 parts by mass of the acrylic polymer (A). In a case in which the content of the non-crosslinked acrylic polymer (C) is 0.1 parts by mass or more, a sufficient blocking preventing effect can be provided. In a case in which the content of the non-crosslinked acrylic polymer (C) is 5 parts by mass or less, the gloss of the acrylic resin film thus obtainable can be enhanced, or the thermal shrinkage of the film thus obtainable can be prevented from increasing.

The non-crosslinked acrylic polymer (C) may be polymerized in one stage, or may be polymerized dividedly in two or more stages. In other words, the non-crosslinked acrylic polymer (C) may be constructed in one stage, or may be constructed in two or more stages. In a case in which polymerization is performed in two or more stages, the compositions of the monomer component used in the respective polymerization stages may be identical or may be different.

The non-crosslinked acrylic polymer (C) may be used singly, or two or more kinds thereof may be used in combination.

<Additives>

The acrylic resin composition of the present invention may include additives as necessary. Examples of the additives include a stabilizer, a lubricating agent, a processing aid, a plasticizer, an impact resistance aid, a foaming agent, a filler, a colorant, and an ultraviolet absorber.

In a case in which the acrylic resin molded product is an acrylic resin film and is used as a protective layer of a substrate, it is preferable that the acrylic resin composition include an ultraviolet absorber in order to impart weather resistance. Preferred examples of the ultraviolet absorber include a benzotriazole-based ultraviolet absorber having a molecular weight of 400 or more, and a triazine-based ultraviolet absorber having a molecular weight of 400 or more. Examples of commercially available products of the former agent include trade name: TINUVIN 234 of Ciba Specialty Chemicals Corp., and trade name: ADEKASTAB LA-31 of Adeka Corp. Examples of commercially available products of the latter agent include trade name: TINUVIN 1577 of Ciba Specialty Chemicals Corp., and trade name: ADEKASTAB LA-46 of Adeka Corp.

The amount of addition of the ultraviolet absorber is preferably 0.1 parts to 10 parts by mass relative to 100 parts by mass of the acrylic polymer (A). The amount of addition of the ultraviolet absorber is more preferably 0.5 parts by mass or more, and even more preferably 1 part by mass or more, relative to 100 parts by mass of the acrylic polymer (A), from the viewpoint of weather resistance. Furthermore, the amount of addition of the ultraviolet absorber is more preferably 5 parts by mass or less, and even more preferably 3 parts by mass or less, relative to 100 parts by mass of the acrylic polymer (A), from the viewpoint of preventing the process contamination at the time of film formation, and from the viewpoint of transparency of the molded product. It is preferable that a photostabilizer be included in the acrylic resin composition. Regarding the photostabilizer, any known agent can be used. As the photostabilizer, a radical scavenger such as a hindered amine-based photostabilizer is preferred. Examples of commercially available products of such a photostabilizer include ADEKASTAB LA-57, ADEKASTAB LA-67, and SANOL LS-770 of Adeka Corp.; and CHIMASSORB 2020FDL and CHIMASSORB 944FDL (all trade names) of BASF SE.

The content of the hindered amine-based photostabilizer is preferably 0.1 to 5 parts by mass relative to 100 parts by mass of the acrylic polymer (A). The content of the hindered amine-based photostabilizer is more preferably 0.2 parts by mass or more relative to 100 parts by mass of the acrylic polymer (A) from the viewpoint of light resistance. Furthermore, the content of the hindered amine-based photostabilizer is more preferably 2 parts by mass or less, and even more preferably 1.5 parts by mass or less, relative to 100 parts by mass of the acrylic polymer (A), from the viewpoint of preventing process contamination at the time of film formation.

The acrylic resin composition of the present invention can be produced into an acrylic resin film by molding the resin composition.

<Melt Kneading>

The acrylic resin composition can be melt kneaded using an extruder or the like and molded into an acrylic resin film.

Examples of the extruder include general apparatuses such as a single-screw extruder, a co-current twin-screw extruder, and a counter-current twin-screw extruder.

For example, from the viewpoint of the kneading effect, a twin-screw kneading extruder may be preferably used. Examples of the twin-screw extruder include TEM series manufactured by Toshiba Machine Co., Ltd.

It is preferable that the extruder have a vent through which the moisture in the raw material acrylic resin composition or the volatilized gas generated from the melt kneaded resin can be removed. At the vent, a pump for pressure reduction such as a vacuum pump is preferably installed. Through such an installation, generated moisture or volatilized gas is efficiently discharged to the outside of the extruder. Also, it is possible to eliminate foreign materials from the resin composition by installing a screen for removing the foreign materials and the like incorporated into the extrusion raw material, at the zone in front of the die part of the extruder. Examples of such a screen include wire gauze, a screen changer, and a sintered metal plate (disc filter or the like).

<Acrylic Resin Film>

The acrylic resin film of the present embodiment can be produced by any known methods, including melt extrusion methods such as a melt casting method, a T-die method, and an inflation method; and a calendering method; however, from the viewpoint of economic efficiency, a T-die method is preferred. The melting temperature at the time of molding is preferably 100° C. to 280° C.

In the case of performing melt extrusion by a T-die method or the like, from the viewpoint of reducing fisheyes in the film, it is preferable that the acrylic resin composition be extruded while filtering the composition in a molten state through a screen mesh having a mesh size of 200 or higher.

[Laminated Film]

On the surface of the acrylic resin film of the present embodiment, another resin can be laminated. For example, in a case in which high surface hardness is needed, an acrylic resin having higher surface hardness than the acrylic resin film of the present embodiment can be disposed on the surface of the acrylic resin film of the present embodiment. Specifically, by using an acrylic resin having a pencil hardness (measured according to JIS K5400) of 2 H or higher, an acrylic resin laminated film having resistance to molding whitening, surface hardness (scratch resistance), and heat resistance can be obtained.

Furthermore, on the surface of the acrylic resin film of the present embodiment, from the viewpoint of enhancing weather resistance and solvent resistance, a fluorine-based resin may be disposed. Regarding the kind of the fluorine-based resin, for example, any known fluorine-based resin can be used. Examples of the fluorine-based resin include a vinylidene fluoride polymer, a copolymer of vinylidene fluoride and vinyl fluoride, tetrafluoroethylene, a copolymer of vinylidene fluoride and an acrylic monomer such as an acrylic acid alkyl ester or a methacrylic acid alkyl ester, and a resin composition containing a vinylidene fluoride polymer as a main component.

Regarding the position of the fluorine-based resin layer in the laminated film, from the viewpoints of weather resistance and solvent resistance of the acrylic resin film, it is preferable that the fluorine-based resin layer be provided as an upper layer of the acrylic resin film (preferably, the outermost layer). This fluorine-based resin layer may include, if necessary, general compounding agents, for example, a stabilizer, a lubricating agent, a processing aid, a plasticizer, an impact resistance agent, a foaming agent, a filler, an antibacterial agent, an antifungal agent, a mold releasing agent, an antistatic agent, a colorant, a matting agent, an ultraviolet absorber, and a photostabilizer.

Regarding the method of laminating an acrylic resin film and another resin, for example, the following methods (1) to (4) may be employed. (1) A method of laminating an acrylic resin film and a film of another resin while disposing the films between heated rolls; (2) a method of melt extruding the acrylic polymer (A) into a film form, while simultaneously laminating the film of the acrylic polymer (A) on a film of another resin; (3) a method of melt extruding another resin into a film form, while simultaneously laminating the film of the other resin on an acrylic resin film; and (4) a method of melt extruding while simultaneously laminating the acrylic polymer (A) and another resin into film forms.

[Tensile Modulus of Film]

The tensile modulus of the acrylic resin film is preferably 800 to 1500 MPa, and more preferably 900 to 1300 MPa. In a case in which the tensile modulus of the acrylic resin film is 800 MPa or more, the film can have adequate rigidity, and handleability can be enhanced. When the tensile modulus of the acrylic resin film is 1500 MPa or less, brittleness of the film can be suppressed, and handleability and secondary processability are enhanced.

[Thickness of Film]

The thickness of the acrylic resin film is preferably 20 to 150 μm, and more preferably 50 to 100 μm. In a case in which the acrylic resin film is used for a laminated molded article, when the thickness of the acrylic resin film is 20 μm or more, weather resistance can be effectively imparted by the molded article. Furthermore, when the thickness of the acrylic resin film is 50 μm or more, sufficient depth in the external appearance of the molded article can be obtained. Furthermore, in a case in which the acrylic resin film is molded into a complicated shape, a sufficient thickness is obtained by stretching. When the thickness of the acrylic resin film is 150 μm or less, the film can have adequate rigidity, and laminating properties and secondary processability of the film are enhanced. Furthermore, in view of the mass per unit area, it becomes economically advantageous. Furthermore, the film forming properties are stabilized, and production of the film is facilitated.

Furthermore, if necessary, the acrylic resin film can be subjected to a surface treatment for imparting various functions. Examples of the surface treatment include printing treatments such as silk printing and inkjet printing; metal vapor deposition for imparting a metallic tone or preventing reflection; sputtering; a wet plating treatment, a surface hardening treatment for increasing the surface hardness; a water-repelling treatment for preventing contamination; a photocatalyst layer forming treatment; an antistatic treatment intended for preventing dust adhesion and cutting electromagnetic waves; an antireflective layer forming treatment; and an antiglare treatment.

Among the treatments described above, in a case in which a printing treatment is applied, it is preferable to perform the printing treatment on a single side of the acrylic resin film. Particularly, back surface printing by which the printed surface is disposed on the adhesion surface contacting the substrate resin, is preferred from the viewpoint of protecting the printed surface or imparting a high-quality feel.

[Surface Roughness of Film]

The arithmetic mean roughness Ra of at least one surface of the acrylic resin film of the present embodiment is 9 to 16 nm. In a case in which the Ra is 9 nm or larger, sticking between the films can be prevented, and the external appearance of the film can be enhanced. Furthermore, in a case in which the Ra of the acrylic resin film is 16 nm or smaller, optical characteristics such as transparency of the film become satisfactory.

The maximum height roughness Rz of at least one surface of the acrylic resin film is 300 to 1550 nm. In a case in which the Rz is 300 nm or larger, sticking between the films can be prevented, and the external appearance of the film can be enhanced. Furthermore, in a case in which the Rz is 1550 nm or smaller, optical characteristics such as transparency of the film become satisfactory.

The arithmetic mean roughness Ra and the maximum height roughness Rz of this acrylic resin film are measured by a surface analysis by ZYGO NEWVIEW manufactured by Canon, Inc.

[Optical Characteristics of Film]

The haze of the acrylic resin film measured according to JIS K7105 is preferably 2% or less, and more preferably 1.5% or less. In a case in which the haze of the acrylic resin film is 2% or less, for example, in a case in which the acrylic resin film is used as a substitute for a clear coating, since the acrylic resin film is highly transparent, the color tone of the substrate can be exhibited effectively. Furthermore, a feeling of depth or a high-quality feel is enhanced.

The degree of glossiness (Gs (60°)) of the acrylic resin measured according to JIS K7105 is preferably 135% or higher, and more preferably 137% or higher. In a case in which the degree of glossiness (Gs (60°)) of the acrylic resin film is 135% or higher, for example, when the acrylic resin film is used as a substitute for a clear coating, a feeling of depth or a high-quality feel is enhanced.

[Laminate of Film and Substrate]

Furthermore, the acrylic resin film of the present embodiment can be laminated on a substrate. For example, when the acrylic resin film is used in a transparent form and laminated on a substrate, the acrylic resin film can be used as a substitute for a clear coating. Therefore, the color tone of the substrate can be exhibited effectively. In regard to the application of exhibiting the color tone of a substrate as such, the acrylic resin film is excellent in transparency, a feeling of depth or a high-quality feel, compared to a polyvinyl chloride film or a polyester film.

Examples of the substrate used for laminating the acrylic resin film include various resin molded articles, wood products, and metal molded articles. Furthermore, among resin molded articles, examples of the resin that constitutes a thermoplastic resin molded article that can be melt adhered to the acrylic resin film of the present embodiment, include an ABS resin, an AS resin, a polystyrene resin, a polycarbonate resin, a vinyl chloride resin, an acrylic resin, a polyester-based resin, and resins containing these resins as main components. Among these, in view of adhesiveness, an ABS resin, an AS resin, a polycarbonate resin, a vinyl chloride resin, and a resin containing these resins as main components are preferred. Furthermore, even if a substrate resin that is not easily melt adhered, such as a polyolefin resin, is used, the acrylic resin film and the substrate can be adhered by using an adhesive layer.

In a case in which the acrylic resin film is laminated on a substrate having small thickness and having a substantially two-dimensional shape, for a substrate that can be thermally fused, the acrylic resin film and the substrate can be bonded by a known method such as thermal lamination. Furthermore, for a substrate that is not capable of thermal fusion, the acrylic resin film and the substrate can be bonded by using an adhesive, or by pressure-sensitive adhesive processing one surface of the acrylic resin film.

Furthermore, in a case in which the acrylic resin film is laminated on a substrate having a three-dimensional shape, the acrylic resin film can be bonded to the substrate by a known molding method such as an insert molding method of inserting an acrylic resin film that has been shaped in advance into a mold for injection molding; or an in-mold molding method of performing injection molding after performing vacuum molding in a mold. Among these, an in-mold molding method is preferred. According to an in-mold molding method, the acrylic resin film is molded into a three-dimensional shape by vacuum molding, and then a substrate resin is flowed into the molded article by injection molding to be integrated with the acrylic resin film. Therefore, an acrylic laminated molded article having an acrylic resin film at the surface layer can be easily obtained. Furthermore, since molding of a film and injection molding can be carried out in one step, excellent workability and economic efficiency are obtained.

The heating temperature for the in-mold molding method is usually a temperature higher than or equal to the temperature at which the acrylic resin is softened, and the heating temperature is preferably 70° C. to 170° C. When the heating temperature is 70° C. or higher, molding can be carried out easily. When the heating temperature is 170° C. or lower, the external appearance of the surface is likely to become satisfactory, and satisfactory mold releasability may be obtained.

Since such an acrylic resin film is excellent in terms of external appearance, weather resistance, transparency, printability, resistance to water-induced whitening, and the like, the acrylic resin film may be used particularly as a high-luminance reflective material that is used in traffic signs, indicator boards, or safety tools intended for visibility. Regarding the kind of the high-luminance reflective material, a capsule type reflective material in which glass beads that have been subjected to aluminum vapor deposition are embedded in a substrate, a prism type reflective material in which a resin sheet that has been subjected to prism processing is used as a reflector, and the like are available. For any of these types, the acrylic resin film described above can be suitably used as a protective film that is used in a state of being laminated on the surface of a reflective material. In a high-luminance reflective material having the aforementioned acrylic resin film on the surface, since deterioration of visibility of the high-luminance reflective material caused by whitening caused by rainwater or the like occurs less, the industrial utility value as a protective film for a high-luminance reflective material is very high.

Furthermore, regarding the field of industrial utilization of the laminate having the acrylic resin film laminated thereon, the laminate is useful as a protective film for, for example, members used in wet areas such as bathroom and kitchen, outdoor construction material parts such as siding materials. Furthermore, the acrylic resin film can also be used for applications other than a protective film for members used in wet areas such as bathroom and kitchen, as well as external decorative construction material parts such as external wall materials and siding materials. Particularly, an acrylic resin film having satisfactory external appearance can also be used as a protective film for a polarizing film that is used for polarizing plates for liquid crystal displays or the like, or as a retardation film that is used for a retardation plate intended for viewing angle compensation and retardation compensation.

EXAMPLES

Hereinafter, the present invention will be described in more detail by way of Examples and Comparative Examples. In the following description, the unit "parts" means "parts by mass", and "percent (%)" means "percent (%) by mass". The abbreviations mean the compounds described in Table 1.

TABLE 1

| Abbreviation | Compound |
| --- | --- |
| MMA | Methyl methacrylate |
| MA | Methyl acrylate |
| n-BA | n-Butyl acrylate |
| St | Styrene |
| BDMA | 1,3-Butylene glycol dimethacrylate |
| AMA | Allyl methacrylate |
| CHP | Cumene hydroperoxide |
| t-BH | t-Butylene hydroperoxide |
| n-OM | n-Octyl mercaptan |
| EDTA | Disodium ethylenediamine tetraacetate |

First, evaluation methods and a Production Example for a rubber-containing polymer will be described.

<Evaluation Methods>

(1) Total Light Transmittance and Haze

An acrylic resin film thus obtained was cut into a size which measured 5 cm on each side, and the total light transmittance and the haze were measured according to JIS K7105 using a HR-100 manufactured by Murakami Color Research Laboratory Co., Ltd., under the conditions with correction.

(2) Blocking Resistance of Film

Twenty sheets of a film thus obtained were superposed, and the film pile was left to stand for one day under the conditions of room temperature at 23° C. and a humidity of 50%. The blocking resistance of the film was evaluated by a visual observation at the surface, according to the following criteria.

A: Blocking is not recognized.

B: Blocking is recognized; however, as soon as the films are bent, the films are separated.

C: Blocking is clearly recognized, and the films acquire a plate shape.

(3) Gloss

An acrylic resin film thus obtained having a thickness of 125 μm was cut into a size which measured 5 cm on each side, and the 60°-surface glossiness was measured according to JIS K7105 using a portable glossimeter (GM-268) manufactured by Konica Minolta, Inc.

(4) Arithmetic Mean Roughness Ra and Maximum Height Roughness Rz

At the surface of an acrylic resin film thus obtained having a thickness of 25 μm, the arithmetic mean roughness Ra and the maximum height roughness Rz were measured using a ZYGO NEWVIEW manufactured by Canon, Inc., under the conditions described below.

Magnification ratio: 2.5 times

Analyze Cntrl (Filter): High Pass

Analyze Cntrl (Filter Type): Gauss Spline Auto.

Production Example 1

Production of Rubber-containing Multistage Polymer (I)

In Production Example 1, a rubber-containing multistage polymer (I) corresponding to the rubber-containing polymer (A1) was produced.

Into a vessel equipped with a stirrer, 10.8 parts of deionized water was introduced, and then a mixture (monomer component (a)) including 0.3 parts of MMA, 4.5 parts of n-BA, 0.2 parts of BDMA, 0.05 parts of AMA, and 0.025 parts of CHP was introduced into the vessel. The content was stirred and mixed at room temperature. Subsequently, while the mixture was stirred, 1.1 parts of an emulsifier (manufactured by Toho Chemical Industry Co., Ltd., trade name: "PHOSPHANOL RS610NA") was introduced into the vessel, and stirring was continued for 20 minutes. Thus, "Emulsion Liquid 1" was produced.

Next, 155.8 parts of deionized water was introduced into a polymerization vessel equipped with a cooler, and the temperature was increased to 75° C. Furthermore, a mixture was prepared by adding 0.0001 parts of ferrous sulfate and 0.0003 parts of EDTA to 2.0 parts of deionized water, and this mixture was introduced into the polymerization vessel. Subsequently, a solution prepared by adding 0.20 parts of sodium formaldehyde sulfoxylate to 0.8 parts of deionized water was introduced into the polymerization vessel all at once. Next, while the content was stirred in a nitrogen atmosphere, Emulsion Liquid 1 was added dropwise into the polymerization vessel for 8 minutes. Subsequently, the mixture was allowed to react continuously for 15 minutes, and thus polymerization of a rubber polymer (also called elastic polymer) (I-a1) was completed. Subsequently, a mixture including 1.5 parts of MMA, 22.5 parts of n-BA, 1.0 parts of BDMA, 0.25 parts of AMA, and 0.016 parts of CHP was added dropwise into the polymerization vessel for 90 minutes. Subsequently, the mixture was allowed to react continuously for 60 minutes, and thus an elastic polymer (I-a2) was produced. In this manner, an elastic polymer (I-A) including the elastic polymer (I-a1) and the elastic polymer (I-a2) was obtained. Furthermore, when the respective mixtures for the elastic polymer (I-a1) and the elastic polymer (I-a2) were individually polymerized under the same conditions as those employed for the method described above, the Tg's of the elastic polymer (I-a1) and the elastic polymer (I-a2) were both −48° C.

Subsequently, a mixture including 6 parts of MMA, 4 parts of n-BA, 0.075 parts of AMA, and 0.0125 parts of CHP was added dropwise into the polymerization vessel for 45 minutes. Subsequently, the mixture was allowed to react continuously for 60 minutes, and thus an intermediate polymer (I-C) was formed. Furthermore, when the mixture for the intermediate polymer (I-C) was polymerized separately under the same conditions as described above, the Tg of the intermediate polymer (I-C) was 20° C.

Subsequently, a mixture (monomer component (b)) including 55.2 parts of MMA, 4.8 parts of n-BA, 0.186 parts of n-OM, and 0.075 parts of t-BH was added dropwise into the polymerization vessel for 140 minutes. Subsequently, the mixture was allowed to react continuously for 140 minutes, and thus a hard polymer (I-B) was formed. Thus, a polymer latex of a rubber-containing multistage polymer (I) was obtained.

The polymer latex of the rubber-containing multistage polymer (I) thus obtained was filtered using a vibrating type filtering apparatus equipped with a SUS mesh (average mesh size: 54 μm) as a filter material. Subsequently, the polymer latex was salted out in an aqueous solution containing 3.0 parts of calcium acetate and washed with water, and thus the polymer was collected. Subsequently, the polymer was dried, and thus the rubber-containing multistage polymer (I) in a powder form was obtained.

Production Example 2

Production of Rubber-containing Multistage Polymer (II)

In Production Example 2, a rubber-containing multistage polymer (II) corresponding to the rubber-containing polymer (A1) was produced.

Into a vessel equipped with a stirrer, 10.8 parts of deionized water was introduced, and then a mixture (monomer component (a)) including 0.3 parts of MMA, 4.5 parts of n-BA, 0.2 parts of BDMA, 0.05 parts of AMA, and 0.025 parts of CHP was introduced into the vessel, and the content was stirred and mixed at room temperature. Subsequently, while the mixture was stirred, 1.3 parts of an emulsifier (manufactured by Toho Chemical Industry Co., Ltd., trade name: "PHOSPHANOL RS610NA") was introduced into the vessel, and stirring was continued for 20 minutes. Thus, "Emulsion Liquid 2" was prepared.

Next, 139.2 parts of deionized water was introduced into a polymerization vessel equipped with a cooler, and the temperature was increased to 75° C. Furthermore, a mixture was prepared by adding 0.20 parts of sodium formaldehyde sulfoxylate, 0.0001 parts of ferrous sulfate and 0.0003 parts of EDTA to 5 parts of deionized water, and this mixture was introduced into the polymerization vessel all at once. Next, while the content was stirred in a nitrogen atmosphere, Emulsion Liquid 2 was added dropwise into the polymerization vessel for 8 minutes. Subsequently, the mixture was allowed to react continuously for 15 minutes, and thus polymerization of a rubber polymer (elastic polymer) (II-a1) was completed. Subsequently, a mixture including 9.6 parts of MMA, 14.4 parts of n-BA, 1.0 parts of BDMA, 0.25 parts of AMA, and 0.016 parts of CHP was added dropwise into the polymerization vessel for 90 minutes. Subsequently, the mixture was allowed to react continuously for 60 minutes, and an elastic polymer (II-a2) was produced. In this manner, an elastic polymer (II-A) including the elastic polymer (II-a1) and the elastic polymer (II-a2) was obtained. Furthermore, when the respective mixtures for the elastic polymer (II-a1) and the elastic polymer (II-a2) were individually polymerized under the same conditions as those employed for the method described above, the Tg of the elastic polymer (II-a1) was −48° C., and the Tg of the elastic polymer (II-a2) was −10° C.

Subsequently, a mixture including 6 parts of MMA, 4 parts of MA, 0.075 parts of AMA, and 0.0125 parts of CHP was added dropwise into the polymerization vessel for 45 minutes. Subsequently, the mixture was allowed to react continuously for 60 minutes, and thus an intermediate polymer (II-C) was formed. Meanwhile, when the mixture for the intermediate polymer (II-C) was polymerized separately under the same conditions as described above, the Tg of the intermediate polymer (II-C) was 60° C.

Subsequently, a mixture (monomer component (b)) including 57 parts of MMA, 3 parts of MA, 0.264 parts of n-OM and 0.075 parts of t-BH was added dropwise into the polymerization vessel for 140 minutes. Subsequently, the mixture was allowed to react continuously for 60 minutes, and thus a hard polymer (II-B) was formed. Thus, a polymer latex of a rubber-containing multistage polymer (II) was obtained.

The polymer latex of the rubber-containing multistage polymer (II) thus obtained was filtered using a vibrating type filtering apparatus equipped with a SUS mesh (average mesh size: 54 μm) as a filter material. Subsequently, the polymer latex was salted out in an aqueous solution containing 3.5 parts of calcium acetate and washed with water, and thus the polymer was collected. Subsequently, the polymer was dried, and thus the rubber-containing multistage polymer (II) in a powder form was obtained.

Production Example 3

Production of Thermoplastic Polymer (III)

In Production Example 3, a thermoplastic polymer (III) corresponding to the non-crosslinked acrylic polymer (C) was produced.

Into a reaction vessel, 200 parts of nitrogen-purged deionized water was introduced, and 1 part of LATEMUL ASK (manufactured by Kao Corp., trade name) as an emulsifier and 0.15 parts of potassium persulfate were further introduced into the reaction vessel.

Next, a mixture including 40 parts of MMA, 2 parts of n-BA and 0.004 parts of n-OM was introduced into the reaction vessel, and the content was stirred for 3 hours at 65° C. in a nitrogen atmosphere. Thus, polymerization was completed.

Subsequently, a mixture including 44 parts of MMA and 14 parts of n-BA was added dropwise into the reaction vessel for 2 hours. Subsequently, the reaction solution was maintained for 2 hours in the reaction solution, and polymerization was completed. Thus, a polymer latex of a thermoplastic polymer (III) was obtained.

The polymer latex of the thermoplastic polymer (III) thus obtained was added to a 0.25% aqueous solution of sulfuric acid, and the polymer was solidified. Subsequently, dehydration, washing with water, and drying were performed, and thus a thermoplastic polymer (III) in a powder form was obtained. The reduced viscosity of the thermoplastic polymer (III) thus obtained was 0.38 L/g.

Production Example 4

Production of Thermoplastic Polymer (IV)

In Production Example 4, a thermoplastic polymer (IV) corresponding to the non-crosslinked acrylic polymer (C) was produced.

Into a reaction vessel, 200 parts of nitrogen-purged deionized water was introduced, and 0.95 parts of LATEMUL ASK (manufactured by Kao Corp., trade name) as an emulsifier and 0.15 parts of potassium persulfate were further introduced into the reaction vessel.

Next, a mixture including 80 parts of MMA and 20 parts of n-BA was introduced into the reaction vessel, and the content was stirred for 4 hours at 65° C. in a nitrogen atmosphere. Thus, polymerization was completed, and thus a polymer latex of a thermoplastic polymer (IV) was obtained.

The polymer latex of the thermoplastic polymer (IV) thus obtained was added to an aqueous solution containing 0.4% of sulfuric acid and 2.5% of aluminum sulfate, and the polymer was solidified. Subsequently, dehydration, washing with water, and drying were performed, and thus a thermoplastic polymer (IV) in a powder form was obtained. The reduced viscosity of the thermoplastic polymer (IV) thus obtained was 0.89 L/g.

Production Example 5

Production of Rubber-containing Multistage Polymer V

In Production Example 5, a rubber-containing multistage polymer V corresponding to the rubber-containing polymer (A1) was produced.

In a nitrogen atmosphere, 244 parts of deionized water was introduced into a polymerization vessel equipped with a reflux cooler, and the temperature was increased to 80° C. Raw Material 1 described below was added to the polymerization vessel, and while the mixture was stirred, a portion equivalent to 1/15 of the mass of Raw Material 2 for an elastic polymer (V-A1) described below was introduced into the polymerization vessel, and the content was maintained for 15 minutes. Next, the rest of Raw Material 2 was continuously added thereto at an increase rate of [Raw Material 2] as a mixture in water of 8%/hour. Subsequently, the mixture was maintained for 60 minutes, and "Latex 1" of an elastic polymer (V-A1) was obtained. Meanwhile, when the raw material for the elastic polymer (V-A1) was separately polymerized under the same conditions as described above, the Tg of the elastic polymer (V-A1) was 24° C.

Subsequently, 0.6 parts of sodium formaldehyde sulfoxylate was introduced into the polymerization vessel containing this Latex 1, and the mixture was maintained for 15 minutes. While the content was stirred at 80° C. in a nitrogen atmosphere, Raw Material 3 for an elastic polymer (V-A2) described below was continuously added at an increase rate of [Raw Material 3] as a mixture in water of 4%/hour. Subsequently, the mixture was maintained for 120 minutes, and polymerization of an elastic polymer (V-A2) was performed. Thus, "Latex 2" was obtained. Meanwhile, when the raw material for the elastic polymer (V-A2) was separately polymerized under the same conditions as described above, the Tg of the elastic polymer (V-A2) was −38° C.

Subsequently, 0.4 parts of sodium formaldehyde sulfoxylate was added to the polymerization vessel containing this Latex 2, and the mixture was maintained for 15 minutes. While the content was stirred at 80° C. in a nitrogen atmosphere, Raw Material 4 for a hard polymer (V-B) described below was continuously added to the polymerization vessel at an increase rate of [Raw Material 4] as a mixture in water of 10%/hour. Subsequently, the mixture was maintained for 60 minutes, and polymerization of a hard polymer (V-B) was performed. Thus, "Latex 3" of a rubber-containing multistage polymer (V) was obtained. Meanwhile, when the raw material for the hard polymer (V-B) was separately polymerized under the same conditions as described above, the Tg of the hard polymer (V-B) was 99° C. Furthermore, the mass average particle size of the rubber-containing multistage polymer (V) was 0.28 m.

Latex 3 of the rubber-containing multistage polymer (V) thus obtained was subjected to coagulation using calcium acetate, aggregation, and a solidification reaction. Subsequently, the reaction product was filtered, washed with water, and then dried, and thus a powder of a rubber-containing multistage polymer (V) was obtained.

TABLE 2

| Raw material | Compound | Amount of use (parts) |
|---|---|---|
| Raw material 1 | Sodium formaldehyde sulfoxylate | 0.6 |
|  | Ferrous sulfate | 0.00012 |
|  | EDTA | 0.003 |
| Raw material 2 | MMA | 22 |
|  | n-BA | 15 |
|  | St | 3 |
|  | AMA | 0.4 |
|  | BDMA | 0.14 |
|  | t-BH | 0.18 |
|  | Partial neutralization product of mixture of 40% of mono(polyoxyethylene nonylphenyl ether)phosphoric acid, 60% of di(polyoxyethylene nonylphenyl ether)phosphoric acid, and sodium hydroxide | 1 |
| Raw material 3 | n-BA | 50 |
|  | St | 10 |
|  | AMA | 0.4 |
|  | BDMA | 0.14 |
|  | t-HH | 0.2 |
|  | Partial neutralization product of mixture of 40% of mono(polyoxyethylene nonylphenyl ether)phosphoric acid, 60% of di(polyoxyethylene nonylphenyl ether)phosphoric acid, and sodium hydroxide | 1 |
| Raw material 4 | MMA | 57 |
|  | MA | 3 |
|  | n-OM | 0.3 |
|  | t-BH | 0.06 |

Example 1

The following materials were mixed using a Henschel mixer.

| | |
|---|---|
| Rubber-containing multistage polymer (I) (acrylic polymer (A)) obtained in Production Example 1 | 100 parts |
| Thermoplastic polymer (III) (non-crosslinked acrylic polymer (C)) obtained in Production Example 3 | 2 parts |
| Thermoplastic polymer (IV) (non-crosslinked acrylic polymer (C)) obtained in Production Example 4 | 1 part |
| "TINUVIN 234" (ultraviolet absorber) manufactured by BASF SE | 2.1 parts |
| "ADEKASTAB LA-31RG" (ultraviolet absorber) manufactured by Adeka Corp. | 2.1 parts |
| "ADEKASTAB LA-57G" (photostabilizer) manufactured by Adeka Corp. | 0.3 parts |
| "IRGANOX 1076" (antioxidant) manufactured by BASF SE | 0.1 parts |
| "AEROSIL R976 (average primary particle size: 7 nm)" (anti-blocking agent (B)) manufactured by Nippon Aerosil Co., Ltd. | 0.3 parts |

The mixture thus obtained was extruded with a twin-screw extruder (TEM35 manufactured by Toshiba Machine Co., Ltd.) and then cut, and the mixture was pelletized. The pellets thus obtained were dried, and then films were formed by a T-die method using a 40φ film-forming machine manufactured by Musashino Kikai Co., Ltd. Thus, films having thicknesses of 25 μm and 125 μm were obtained. The cylinder temperature at this time was set to 220° C. to 250° C., and the temperature of the T-die was set to 250° C. For the film having a thickness of 25 μm, the total light transmittance, haze, blocking resistance of the film, arithmetic mean roughness Ra, and maximum height roughness Rz were evaluated. Furthermore, for the film having a thickness of 125 m, gloss was evaluated. The results are presented in Table 3.

Example 2

Films were obtained in the same manner as in Example 1, except that a mixture of 80 parts of the rubber-containing multistage polymer (II) obtained in Production Example 2, 10 parts of the rubber-containing multistage polymer (V) obtained in Production Example 5, and 10 parts of "ACRYPET MD" manufactured by Mitsubishi Rayon Co., Ltd., which is a non-rubber-containing polymer, was used as the acrylic polymer (A) instead of 100 parts of the rubber-containing multistage polymer (I) obtained in Production Example 1.

For the film thus obtained, the total light transmittance, haze, blocking resistance of the film, arithmetic mean roughness Ra, maximum height roughness Rz, and gloss were evaluated. The results are presented in Table 3.

Example 3

A film was obtained in the same manner as in Example 1, except that 3 parts of the thermoplastic polymer (IV) was used as the non-crosslinked acrylic polymer (C) instead of 2 parts of the thermoplastic polymer (III) and 1 part of the thermoplastic polymer (IV), and except that the amount of use of "AEROSIL R976" as the anti-blocking agent (B) was changed to 0.2 parts.

For the film thus obtained, the total light transmittance, haze, blocking resistance of the film, arithmetic mean roughness Ra, maximum height roughness Rz, and gloss were evaluated. The results are presented in Table 3.

Example 4

A film was obtained in the same manner as in Example 1, except that 3 parts of the thermoplastic polymer (IV) was used as the non-crosslinked acrylic polymer (C) instead of 2 parts of the thermoplastic polymer (III) and 1 part of the thermoplastic polymer (IV).

For the film thus obtained, the total light transmittance, haze, blocking resistance of the film, arithmetic mean roughness Ra, maximum height roughness Rz, and gloss were evaluated. The results are presented in Table 3.

Example 5

A film was obtained in the same manner as in Example 1, except that 2 parts of the thermoplastic polymer (III) was used as the non-crosslinked acrylic polymer (C) instead of 2 parts of the thermoplastic polymer (III) and 1 part of the thermoplastic polymer (IV).

For the film thus obtained, the total light transmittance, haze, blocking resistance of the film, arithmetic mean roughness Ra, maximum height roughness Rz, and gloss were evaluated. The results are presented in Table 3.

Example 6

A film was obtained in the same manner as in Example 5, except that 0.02 parts of "MICROD KM-369 (average particle size: 5 µm)" manufactured by Tokai Chemical Industry Co., Ltd. was used as the anti-blocking agent (B) instead of 0.3 parts of "AEROSIL R976" manufactured by Nippon Aerosil Co., Ltd.

For the film thus obtained, the total light transmittance, haze, blocking resistance of the film, arithmetic mean roughness Ra, maximum height roughness Rz, and gloss were evaluated. The results are presented in Table 3.

Example 7

A film was obtained in the same manner as in Example 5, except that 0.05 parts of "MICROD KM-369HW (average particle size: 5 µm)" manufactured by Tokai Chemical Industry Co., Ltd. was used as the anti-blocking agent (B) instead of 0.3 parts of "AEROSIL R976" manufactured by Nippon Aerosil Co., Ltd.

For the film thus obtained, the total light transmittance, haze, blocking resistance of the film, arithmetic mean roughness Ra, maximum height roughness Rz, and gloss were evaluated. The results are presented in Table 3.

Example 8

A film was obtained in the same manner as in Example 1, except that the amount of addition of "AEROSIL R976" manufactured by Nippon Aerosil Co., Ltd. was changed to 0.7 parts.

For the film thus obtained, the total light transmittance, haze, blocking resistance of the film, arithmetic mean roughness Ra, maximum height roughness Rz, and gloss were evaluated. The results are presented in Table 3.

Example 9

A film was obtained in the same manner as in Example 1, except that the amount of addition of "AEROSIL R976" manufactured by Nippon Aerosil Co., Ltd. was changed to 1.0 part.

For the film thus obtained, the total light transmittance, haze, blocking resistance of the film, arithmetic mean roughness Ra, maximum height roughness Rz, and gloss were evaluated. The results are presented in Table 3.

Comparative Example 1

A film was obtained in the same manner as in Example 2, except that the non-crosslinked acrylic polymer (C) and the anti-blocking agent (B) were not added.

For the film thus obtained, the total light transmittance, haze, blocking resistance of the film, arithmetic mean roughness Ra, maximum height roughness Rz, and gloss were evaluated. The results are presented in Table 3.

Comparative Example 2

A film was obtained in the same manner as in Example 5, except that the anti-blocking agent (B) was not added.

For the film thus obtained, the total light transmittance, haze, blocking resistance of the film, arithmetic mean roughness Ra, maximum height roughness Rz, and gloss were evaluated. The results are presented in Table 3.

Comparative Example 3

A film was obtained in the same manner as in Comparative Example 1, except that the amount of addition of the anti-blocking agent (B) was changed to 0.1 parts.

For the film thus obtained, the total light transmittance, haze, blocking resistance of the film, arithmetic mean roughness Ra, maximum height roughness Rz, and gloss were evaluated. The results are presented in Table 3.

Comparative Example 4

A film was obtained in the same manner as in Comparative Example 1, except that the amount of addition of the anti-blocking agent (B) was changed to 0.3 parts.

For the film thus obtained, the total light transmittance, haze, blocking resistance of the film, arithmetic mean roughness Ra, maximum height roughness Rz, and gloss were evaluated. The results are presented in Table 3.

Comparative Example 5

A film was obtained in the same manner as in Comparative Example 4, except that 100 parts of the rubber-containing multistage polymer (I) obtained in Production Example 1 was used as the acrylic polymer (A).

For the film thus obtained, the total light transmittance, haze, blocking resistance of the film, arithmetic mean roughness Ra, maximum height roughness Rz, and gloss were evaluated. The results are presented in Table 3.

Comparative Example 6

A film was obtained in the same manner as in Comparative Example 5, except that 1.0 part of "AEROSIL R976" manufactured by Nippon Aerosil Co., Ltd. was used.

For the film thus obtained, the total light transmittance, haze, blocking resistance of the film, arithmetic mean roughness Ra, maximum height roughness Rz, and gloss were evaluated. The results are presented in Table 3.

Comparative Example 7

A film was obtained in the same manner as in Example 1, except that the anti-blocking agent (B) was not added.

For the film thus obtained, the total light transmittance, haze, blocking resistance of the film, arithmetic mean roughness Ra, maximum height roughness Rz, and gloss were evaluated. The results are presented in Table 3.

Comparative Example 8

A film was obtained in the same manner as in Comparative Example 7, except that 2 parts of the thermoplastic polymer (III) obtained in Production Example 3 and 3 parts of the thermoplastic polymer (IV) obtained in Production Example 4 were used as the non-crosslinked acrylic polymer (C).

For the film thus obtained, the total light transmittance, haze, blocking resistance of the film, arithmetic mean roughness Ra, maximum height roughness Rz, and gloss were evaluated. The results are presented in Table 3.

Comparative Example 9

A film was obtained in the same manner as in Comparative Example 5, except that 3.0 parts of "AEROSIL R976" manufactured by Nippon Aerosil Co., Ltd. was used.

For the film thus obtained, the total light transmittance, haze, blocking resistance of the film, arithmetic mean roughness Ra, maximum height roughness Rz, and gloss were evaluated. The results are presented in Table 3.

TABLE 3

| | Acrylic polymer (A) | | | Non-crosslinked acrylic polymer (C) | | Anti-blocking agent (B) | | | Total light trans-mittance [%] | HAZE [%] | Anti-blocking properties of film | Gloss [%] | Arithmetic mean roughness Ra [nm] | Maximum height roughness Rz [nm] |
|---|---|---|---|---|---|---|---|---|---|---|---|---|---|---|
| | I | II | V | ACRYPET MD | III | IV | AEROSIL R976 | MICROD KM-369 | MICROD KM-369HW | | | | | | |
| Example 1 | 100 | — | — | — | 2 | 1 | 0.3 | — | — | 92.6 | 0.9 | A | 141 | 9.6 | 445 |
| Example 2 | — | 80 | 10 | 10 | 2 | 1 | 0.3 | — | — | 92.6 | 0.8 | A | 141 | 10.3 | 451 |
| Example 3 | 100 | — | — | — | — | 3 | 0.2 | — | — | 92.8 | 0.8 | A | 138 | 8.8 | 326 |
| Example 4 | 100 | — | — | — | — | 3 | 0.3 | — | — | 92.6 | 0.8 | A | 141 | 9.6 | 435 |
| Example 5 | 100 | — | — | — | 2 | — | 0.3 | — | — | 92.8 | 0.9 | A | 139 | 15.7 | 345 |
| Example 6 | 100 | — | — | — | 2 | — | — | 0.02 | — | 92.8 | 0.8 | A | 138 | 11.9 | 1038 |
| Example 7 | 100 | — | — | — | 2 | — | — | — | 0.05 | 92.6 | 0.8 | A | 138 | 16.0 | 1532 |
| Example 8 | 100 | — | — | — | 2 | 1 | 0.7 | — | — | 92.5 | 1.2 | A | 139 | 9.4 | 776 |
| Example 9 | 100 | — | — | — | 2 | 1 | 1.0 | — | — | 92.4 | 1.5 | A | 137 | 10.4 | 702 |
| Comparative Example 1 | — | 80 | 10 | 10 | — | — | — | — | — | 92.6 | 0.7 | C | 141 | 9.5 | 107 |
| Comparative Example 2 | 100 | — | — | — | 2 | — | — | — | — | 92.7 | 0.7 | C | 141 | 7.0 | 125 |
| Comparative Example 3 | — | 80 | 10 | 10 | — | — | 0.1 | — | — | 92.6 | 0.6 | C | 140 | 7.2 | 253 |
| Comparative Example 4 | — | 80 | 10 | 10 | — | — | 0.3 | — | — | 92.6 | 0.9 | C | 140 | 9.4 | 354 |
| Comparative Example 5 | 100 | — | — | — | — | — | 0.3 | — | — | 92.4 | 0.8 | C | 142 | 7.8 | 307 |
| Comparative Example 6 | 100 | — | — | — | — | — | 1.0 | — | — | 92.4 | 1.6 | B | 136 | 15.2 | 1566 |
| Comparative Example 7 | 100 | — | — | — | 2 | 1 | — | — | — | 92.5 | 0.8 | B | 141 | 7.3 | 277 |
| Comparative Example 8 | 100 | — | — | — | 2 | 3 | — | — | — | 92.5 | 1.0 | A | 114 | 45.6 | 1100 |
| Comparative Example 9 | 100 | — | — | — | — | — | 3.0 | — | — | 92.4 | 2.3 | A | 132 | 35.0 | 2702 |

The following was made clear from the Examples and Comparative Examples described above. That is, the films obtained by molding the acrylic resin compositions obtained in Examples 1 to 9 exhibited satisfactory blocking resistance and optical characteristics. Therefore, the films had satisfactory external appearance while having the weather resistance and designability that are inherent to acrylic resins.

On the other hand, the films obtained by molding the acrylic resin compositions of Comparative Examples 1, 2 and 7 exhibited satisfactory optical characteristics; however, since the films did not contain the anti-blocking agent (B), the films had low blocking resistance, distortion and the like occurred in the films, and the external appearance was poor.

The films obtained by molding the acrylic resin compositions of Comparative Examples 3 to 5 exhibited poor blocking resistance because the films did not contain the non-crosslinked acrylic polymer (C). In Comparative Example 6, the amount of addition of the anti-blocking agent (B) was increased compared to Comparative Example 5; however, a balance between the blocking resistance and the optical characteristics of the film was not achieved, and neither one was satisfactory. Comparative Example 8 did not contain the anti-blocking agent (B); however, since a large amount of the non-crosslinked acrylic polymer (C) was used, the film had satisfactory blocking resistance. However, the film exhibited poor glossiness. Comparative Example 9 did not contain the non-crosslinked acrylic polymer (C); however, since a large amount of the anti-blocking agent (B) was used, the film had satisfactory blocking resistance. However, the film exhibited a high haze value and poor optical characteristics.

This patent application claims priority based on Japanese Patent Application No. 2014-049823 filed on Mar. 13, 2014, the entire disclosure of which is incorporated herein.

Thus, the present invention has been described with reference to embodiments and Examples; however, the present invention is not intended to be limited to the embodiments and Examples described above. Regarding the configuration and details of the present invention, various modifications can be made within the scope of the present invention to the extent that can be comprehended by those ordinarily skilled in the art.

INDUSTRIAL APPLICABILITY

The acrylic resin composition of the present invention has satisfactory blocking resistance and optical characteristics, and particularly a film obtained by molding this acrylic resin composition has weather resistance and designability, while distortion and gauge band do not easily occur. Therefore, an acrylic resin film having satisfactory external appearance can be obtained. The acrylic resin film of the present invention can be effectively used for, for example, applications of interior and exterior decoration of constructions, cover films for traffic signs, and particularly for outdoor applications where direct solar radiation is severe.

The invention claimed is:

1. An acrylic resin film obtained by molding an acrylic resin composition comprising an acrylic polymer (A), an anti-blocking agent (B), and a non-crosslinked acrylic polymer (C),
   wherein the non-crosslinked acrylic polymer (C) is a polymer of a monomer component including 50% to 100% by mass of methyl methacrylate (c1), the polymer having a reduced viscosity of 0.2 to 2 L/g,
   wherein the acrylic resin film has an arithmetic mean roughness Ra on at least one surface of 9 to 16 nm, and a maximum height roughness Rz on at least one surface of 300 to 1550 nm, and
   wherein the acrylic resin film has a value of haze measured according to JIS K7 105 of 0.8 to 2%, and a film thickness of 20 to 150 μm.

2. The acrylic resin film according to claim 1, wherein a content of the anti-blocking agent (B) is 0.01 parts to 0.5 parts by mass, and a content of the non-crosslinked acrylic polymer (C) is 0.1 parts to 5 parts by mass, relative to 100 parts by mass of the acrylic polymer (A).

3. The acrylic resin film according to claim 1, wherein an average primary particle size of the anti-blocking agent (B) is 5 nm to 10 μm.

4. The acrylic resin film according to claim 1, wherein the anti-blocking agent (B) is in the form of inorganic particles.

5. The acrylic resin film according to claim 1, wherein the anti-blocking agent (B) is silicon dioxide.

6. The acrylic resin film according to claim 1, wherein the acrylic polymer (A) includes at least one of a rubber-containing polymer (A1) and a non-rubber-containing polymer (A2).

7. The acrylic resin film according to claim 6, wherein a percentage content of the rubber-containing polymer (A1) in the acrylic polymer (A) is 10% to 100% by mass, and a percentage content of the non-rubber-containing polymer (A2) is 90% to 0% by mass.

8. The acrylic resin film according to claim 6, wherein a reduced viscosity of the non-rubber-containing polymer (A2) is 0.03 to 0.1 L/g.

9. The acrylic resin film according to claim 1, having a tensile modulus of 800 to 1500 MPa.

10. The acrylic resin film according to claim 1, having a value of glossiness measured according to JIS K7105 of 135% or more.

11. The acrylic resin film according to claim 1, wherein a content of the anti-blocking agent (B) is 0.02 parts to 0.4 parts by mass relative to 100 parts by mass of the acrylic polymer (A).

12. The acrylic resin film according to claim 1, wherein a content of the non-crosslinked acrylic polymer (C) is 0.5 parts to 4 parts by mass relative to 100 parts by mass of the acrylic polymer (A).

13. The acrylic resin film according to claim 1, having a tensile modulus of 900 to 1300 MPa.

14. The acrylic resin film according to claim 1, having a film thickness of 50 to 100 μm.

15. The acrylic resin film according to claim 6, wherein the rubber-containing polymer (A1) is obtained by polymerizing a monomer component (b) including 51% by mass or more of an alkyl methacrylate in the presence of a rubber polymer obtained by polymerizing a monomer component (a) including 30% by mass or more of an alkyl acrylate.

16. The acrylic resin film according to claim 6, wherein the non-rubber-containing polymer (A2) is a polymer having a monomer component composed of 50% to 100% by mass of an alkyl methacrylate having an alkyl group having 1 to 4 carbon atoms and 0% to 50% by mass of a vinyl monomer.

17. The acrylic resin film according to claim 6, wherein the non-rubber-containing polymer (A2) is a polymer having a monomer component composed of 70% to 100% by mass of an alkyl methacrylate having an alkyl group having 1 to 4 carbon atoms and 0% to 30% by mass of a vinyl monomer.

18. The acrylic resin film according to claim 16, wherein the non-rubber-containing polymer (A2) has a reduced viscosity of 0.03 to 0.1 L/g.

19. The acrylic resin film according to claim 16, wherein the non-rubber-containing polymer (A2) has a reduced viscosity of 0.03 to 0.08 L/g.

* * * * *